United States Patent
Nooyen et al.

[19]

[11] Patent Number: 5,921,205
[45] Date of Patent: Jul. 13, 1999

[54] SOW FARROWING STATION

[75] Inventors: David J. Nooyen; Erick J. Nooyen, both of Blenheim, Canada

[73] Assignee: Nooyen Farrowing Station Ltd., Ontario, Canada

[21] Appl. No.: 08/915,741

[22] Filed: Aug. 21, 1997

[30] Foreign Application Priority Data

Apr. 18, 1997 [CA] Canada ................................. 2203064

[51] Int. Cl.$^6$ ...................................................... A01K 1/02
[52] U.S. Cl. ............................................................ 119/505
[58] Field of Search .................................. 119/503, 505, 119/509, 845

[56] References Cited

U.S. PATENT DOCUMENTS

| | | |
|---|---|---|
| 2,602,419 | 7/1952 | Johnson . |
| 3,084,668 | 4/1963 | McMurray et al. ..................... 119/503 |
| 3,237,600 | 3/1966 | Behrens et al. . |
| 4,112,872 | 9/1978 | Van Huis ............................ 119/845 X |
| 4,145,993 | 3/1979 | Notarianni et al. . |
| 4,428,324 | 1/1984 | Salminen . |
| 4,471,719 | 9/1984 | Thomson . |
| 4,793,287 | 12/1988 | Hofmann . |
| 5,372,091 | 12/1994 | Rhodes . |

FOREIGN PATENT DOCUMENTS 2341026  3/1974  Germany ............................... 119/509

*Primary Examiner*—Robert P. Swiatek
*Attorney, Agent, or Firm*—Bacon & Thomas, PLLC

[57] ABSTRACT

A sow farrowing station to reduce the mortality of piglets includes a slab, a surrounding crate to constrain the sow, the slab defining within a crate a floor transport region consisting of independent pressure sensitive members which travel over the region to transport piglets from beneath the sow, but when the sow itself steps onto one of the pressure sensitive transport members, that member stops its travel so that the sow does not have to continually "walk" yet, when the sow lies down all the transport members are arrested and the piglets can then move to nurse from the sow.

6 Claims, 2 Drawing Sheets

SOW FARROWING STATION

This invention relates to a sow farrowing station.

BACKGROUND OF THE INVENTION

When sows have piglets, their offspring must nurse and there is a high mortality rate during the first days of the piglets' life because the sow tends to roll over onto the piglet during feeding or just preparatory to feeding as when the sow tries to lay down. When doing so, there is a substantial risk that it will lay down on a piglet and kill it. Piglet mortality is high.

MCMURRAY et al. in U.S. Pat. No. 3,084,668 issued Apr. 9, 1963 disclosed a farrowing pen construction for positioning the sow in a specially designed farrowing pen to thereby regulate the position to be assumed by the sow, both during normal piglet feeding and during sow eating operations so as to provide a safe movement of the piglets to and fro from the sow.

NOTARIANNI et al. in U.S. Pat. No. 4,159,993 issued Mar. 27, 1979 discloses a piglet saver wherein two adjacent chambers are provided, one for the piglets and one for the sow. The sow is confined so that she may eat standing up or lie down into the suckling position on her side whereupon there is provided an opening between the chambers but only so long as the sow is laying down.

Both of these inventions attempt to reduce the mortality of the piglets.

THE INVENTION

It is an object of the invention to reduce the mortality rate of piglets during the nursing phase with the sow and to provide a novel sow station into which the sow may stand in an upright position and when, as it lays down for suckling of the piglets, the floor upon which the sow stands is transported laterally so that any little piglet standing thereon is moved from beneath the sow and out of harm's way so that when the sow finally lays down, the piglets can nurse. Mortality is substantially reduced.

This is achieved by a sow farrowing station having a novel floor transport system that selectively moves piglets standing of the floor from beneath the sow as the sow moves herself from a vertical and standing position to a laying position, and hence, transports the piglets out of harm's way yet, when the sow lays on the floor, the transport system stops so the piglets can come back onto the moveable floor to nurse form the sow.

The invention therefore contemplates a sow farrowing station for constraining the movement of a sow so she is at liberty to stand therein and to lay down within, thereupon to nurse her litter of piglets, the station comprising a surrounding floor slab, carrying a farrowing crate for constraining the sow therein, the floor slab defining within the farrowing crate a perimeter across which independent pressure sensitive floor transport members travel to arrestingly stop when a predetermined pressure upon a member is exceeded.

Particularly, the sow farrowing station comprises a surrounding floor slab, carrying a farrowing crate for constraining the sow, the floor slab defining within the farrowing crate a floor transport region, the floor transport region carrying a plurality of relatively parallel movable endless belts, means for transporting the belts across the floor transport region and, pressure responsive means for stopping travel of a belt crossing over the floor transport region when a predetermined pressure is applied to that belt, as by the hoof of the sow, but not that of a piglet.

BRIEF DESCRIPTION OF THE DRAWINGS

The invention will now be described by way of example and reference to the accompanying drawings in which.

PREFERRED EMBODIMENTS

Figure 1:
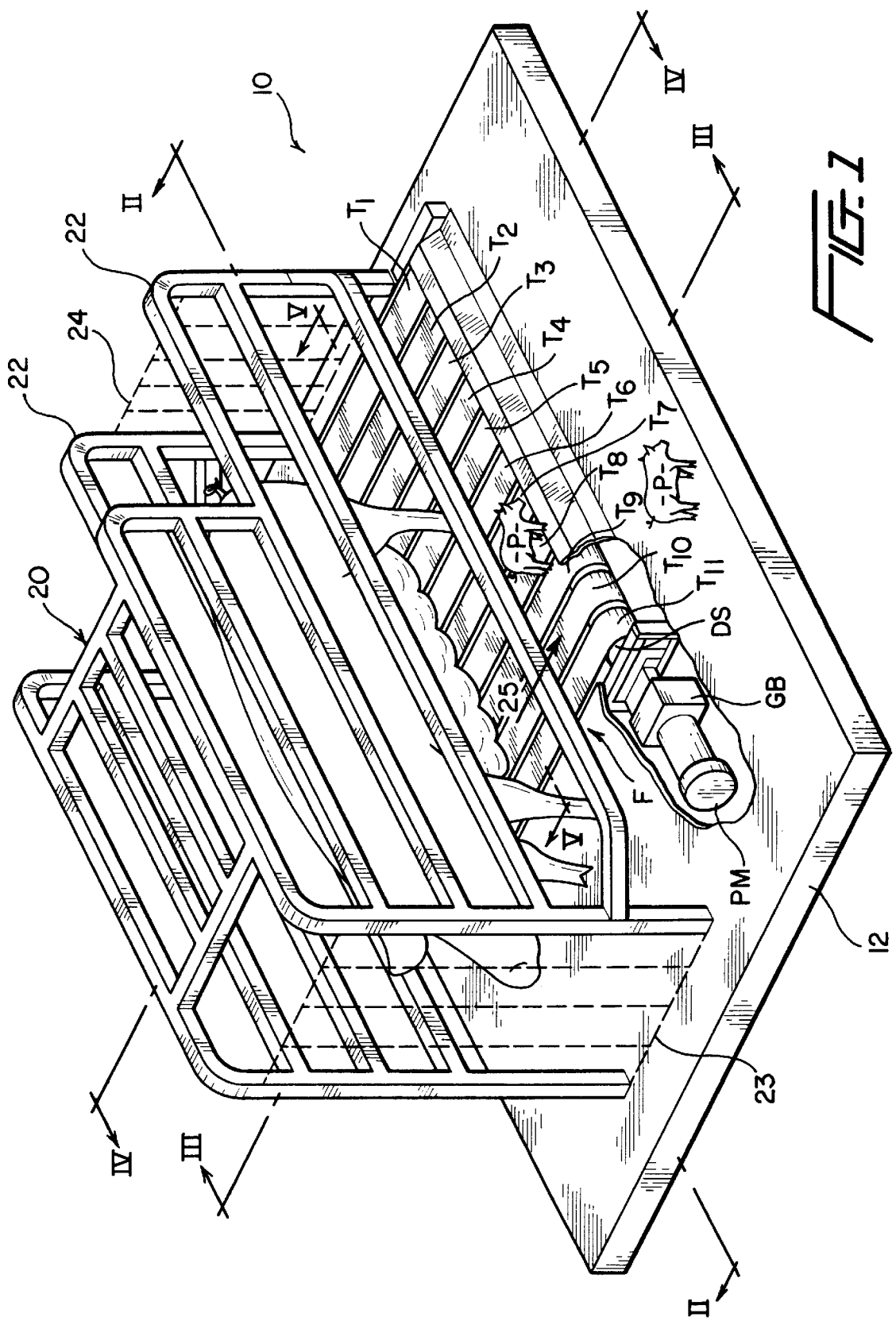
FIG. 1 is a perspective view of a novel sow farrowing station according to the invention showing sow, piglets and a floor transport mechanism being a plurality of spatially disposed endless movable belts.
Figure 3:
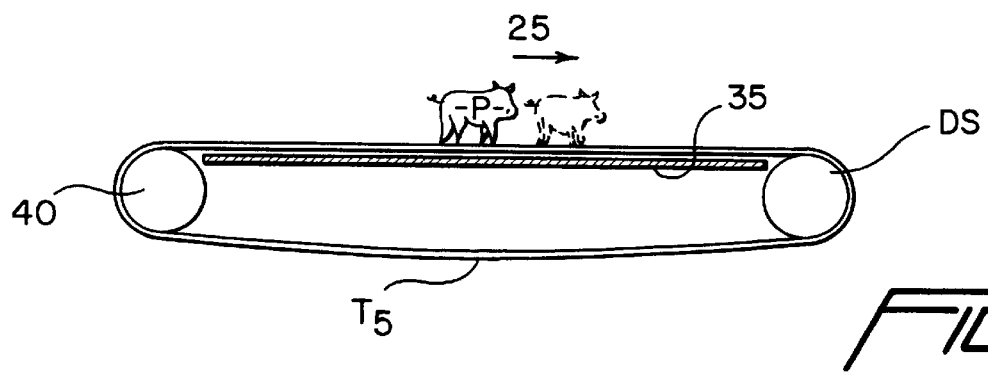
FIG. 3 is a section along lines III—III of FIG. 1.

Referring to the perspective, partially broken away, FIG. 1, a farrowing station is generally shown as (10) and consists of a surrounding floor slab (12) carrying a farrowing crate (20) or frame which is able to confine a sow (S). This is achieved by the farrowing crate (20) having opposite sides (22) extending in a parallel fashion with movable front end, shown in phantom, as (23) and a rear movable end, shown in phantom, as (24). The front and rear ends (23) and (24) can be either latchable, with a hinge, or lift-up members that can be placed downward and locked into position. Their actual mechanics to being held by the sides (22) is irrelevant. The sow (S) can be placed within the crate (20) from the rear and exit from the front, as may be desired. The floor (F) within the crate (20) is structured with a plurality of spatially disposed endless belts ($T_1$) through ($T_{11}$) which extend laterally from side to side and are traversed by an electronic motor or prime mover (PM) coupling through a gear box (GB) to a cylindrical drive spindle (DS) which is driven into rotation by the prime mover (PM) to transport the endless belts ($T_1$)–($T_{11}$), now referring to FIG. 1, from upper left to right in the direction of arrow (25). Piglets (P) standing on the belts ($T_1$)–($T_{11}$), and in FIG. 4, belt $T_5$ are transported from beneath the sow (S) out of harm's way onto the surrounding floor (12) beyond the crate (20). This is depicted in the cross-sectional FIG. 3 where the piglet (P) is moved from the solid position to the phantom position and hence, out of harm's way from the sow, not shown.

Each endless belt ($T_1$)–($T_{11}$) is traveled by the cylindrical drive spindle (DS) and each belt or track is confined between track holding side rails (30), which are integral protrusions to a sub-floor (35), the protrusions defining a plurality of spatially disposed parallel track accommodating recesses (36) into which and over which each of the tracks ($T_1$)–($T_{11}$) travels. This floor (F) is composed of stainless steel and this avoids corrosion due to urine and feces. Each endless belt ($T_1$)–($T_{11}$) travels at its opposite end over an idler pulley (40) having a U-shaped peripheral race through which the belt ($T_1$)–($T_{11}$) travels. Each of the pulleys (40) rotates along or about a longitudinal axis oriented parallel to that of the spindle (DS). When the spindle rotates, each of the tracks ($T_1$)–($T_{11}$) travels in direction (25).

Figure 2:
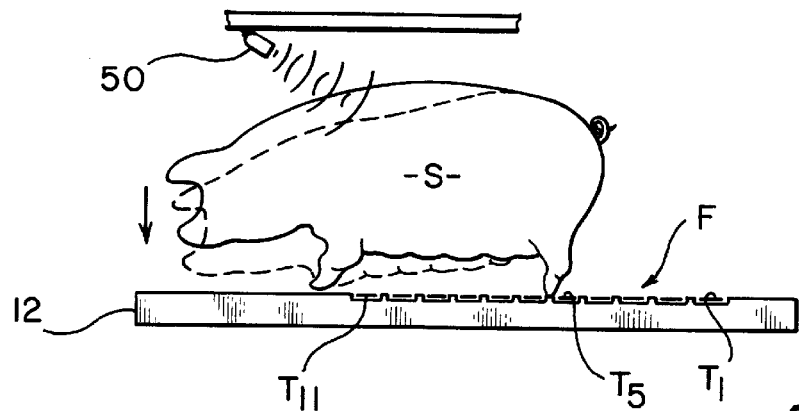
FIG. 2 is a section along lines II—II of FIG. 1 showing the sow on the transport system and in phantom sow location during the laying down process.
Figure 4:
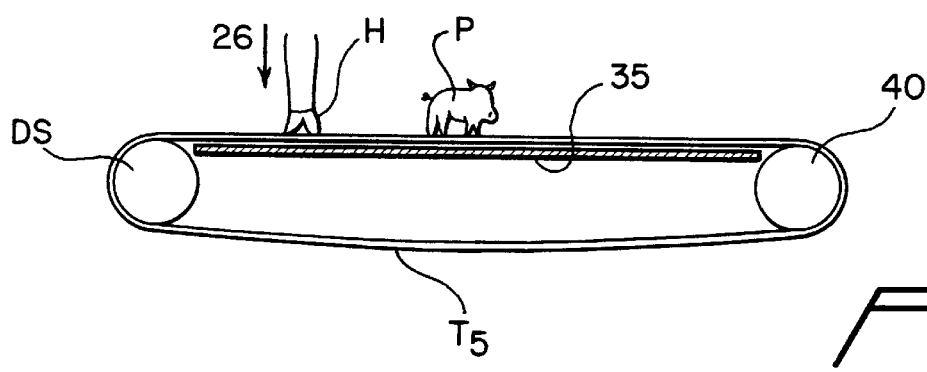
FIG. 4 is a section along lines IV—IV of FIG. 1.
Figure 5:
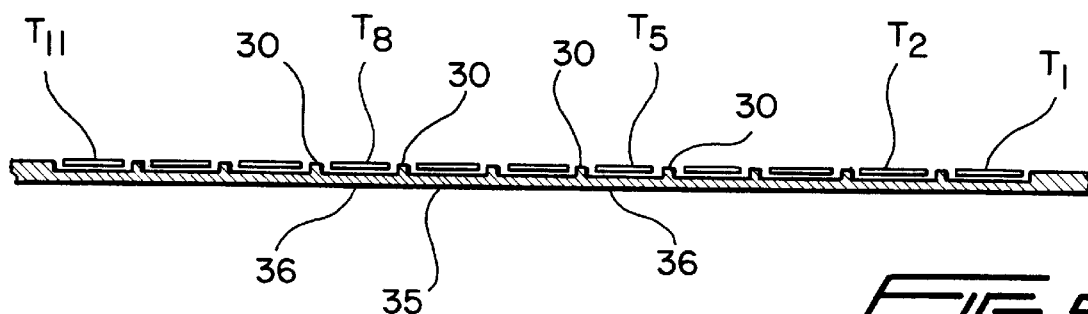
FIG. 5 is a section along lines V—V of FIG. 1.

Referring to FIGS. 1 and 4, the left back hoof of the sow (S) is shown resting on track ($T_5$) and this causes the depression of the endless belt ($T_5$) in the direction of arrow (26) whereupon the endless belt ($T_5$) is urged against the upper surface to the sub-floor (35). This causes the spindle (DS) to continually rotate, as shown in FIG. 4, but the belt ($T_5$) is stopped from travel as a result of the weight of the hoof (H) and the frictional engagement of the underside of the belt ($T_5$) with the sub-floor (35). The idler pulley (40) does not rotate. The sow (S) therefore can stand freely without being forced to walk laterally. It is for this reason that it is preferred that the front hooves of the sow, as shown in FIG. 1, be positioned so as to stand firmly on the slab (12) while the rear hooves can stand on one or more of the travelable belts ($T_1$–$T_{11}$). When the sow (S) begins to lie down, as shown in FIG. 2, a sensor (50) measures the elevational change of the sow (S) and when the sow comes from the phantom position upwards to the solid standing position, the prime mover is activated so the endless belts ($T_1$–$T_{11}$) travel. When the sow (S) fully lies down on the floor (F), she is able to halt the travel of the belts under her notwithstanding the fact the prime mover may or may not be in rotation. In any event, the endless belts ($T_1$–$T_{11}$) travel laterally to carry the piglets off and out of harm's way from beneath the sow, and also even during the process of the sow lying down so as to nurse her piglets.

Experimental results of the mortality of litters farrowed without the invention are set forth in Table I; and, the mortality rate with the invention in Table II. Reviewing each table, particularly the "MORTALITY:Laid-on", the mortality rate is reduced, from 5.25% in Table I to 1.55% in Table II. Utilizing the invention therefore, clearly decreases the mortality rate.

TABLE I

LITTERS FARROWED WITOUT "NOOYEN FARROWING STATION"

| | | | | MORTALITY: | | | |
|---|---|---|---|---|---|---|---|
| DATE | # SOWS | PIGS BORN | LITTER I.D. | Laid on | Low Viab. | unknown | Pigs out |
| August 02 | 1 | 10 | | | | 1 | 9 |
| August 08 | 3 | 31 | | 2 | | | 29 |
| August 14 | 1 | 11 | | | 1 | | 10 |
| August 22 | 4 | 39 | | 1 | | | 38 |
| August 29 | 2 | 20 | | 1 | | | 19 |
| September 02 | 1 | 10 | | | 1 | | 9 |
| September 03 | 1 | 11 | | | | | 11 |
| September 06 | 3 | 32 | | 2 | | | 30 |
| September 08 | 1 | 11 | | 1 | | | 10 |
| September 12 | 2 | 20 | | 1 | | | 19 |
| September 17 | 2 | 18 | | | | | 18 |
| September 18 | 4 | 42 | | 2 | | | 40 |
| September 24 | 1 | 12 | | 1 | 1 | 0 | 10 |
| September 26 | 1 | 13 | | | | | 13 |
| October 02 | 3 | 9 | | 2 | | | 7 |
| October 04 | 1 | 9 | | 1 | | | 8 |
| October 07 | 3 | 30 | | 2 | | | 28 |
| October 11 | 1 | 11 | | | 1 | | 10 |
| October 22 | 2 | 19 | | | | | 19 |
| October 26 | 1 | 11 | | | | | 11 |
| October 26 | 1 | 12 | | | | | 12 |
| October 31 | 4 | 44 | | 2 | | | 42 |
| October 31 | 1 | 11 | | | 1 | | 10 |
| November 02 | 1 | 11 | | | | | 11 |
| November 04 | 3 | 29 | | 2 | | | 27 |
| November 05 | 1 | 10 | | | | | 10 |
| November 07 | 2 | 19 | | | | | 19 |
| November 08 | 1 | 10 | | | | 1 | 9 |
| November 09 | 5 | 56 | | 3 | | | 53 |
| November 12 | 1 | 9 | | | | | 9 |
| November 14 | 2 | 22 | | 1 | 1 | | 20 |
| November 14 | 1 | 12 | | 1 | | | 11 |
| November 15 | 1 | 11 | | | | | 11 |
| November 16 | 3 | 31 | | 1 | | | 30 |
| November 23 | 1 | 11 | | | 1 | | 10 |
| November 26 | 3 | 32 | | 3 | | | 29 |
| November 26 | 1 | 11 | | | | | 11 |
| November 29 | 3 | 36 | | 2 | 1 | | 33 |
| December 01 | 1 | 10 | | 1 | | | 9 |
| December 04 | 2 | 19 | | | | 1 | 18 |
| December 05 | 1 | 11 | | | | | 11 |
| December 07 | 3 | 28 | | 1 | | | 27 |
| December 08 | 1 | 11 | | | | | 11 |
| December 10 | 4 | 39 | | 3 | | | 36 |
| December 16 | 1 | 10 | | | | | 10 |
| December 22 | 6 | 65 | | 5 | | | 60 |

TABLE I-continued

| | | | | | | |
|---|---|---|---|---|---|---|
| December 28 | 1 | 11 | | 1 | | 10 |
| January 02 | 2 | 18 | | 1 | | 17 |
| January 06 | 1 | 11 | | | | 11 |
| | 96 | 979 | | 43 | 8 | 3 | 925 |

| | | | | | |
|---|---|---|---|---|---|
| | | | | total: | 54 |
| Pigs Born/litter | | | 10.20 | | |
| Mortality: | Laid on: | | 43 | 4.39% | Total Mortality: 5.52% |
| | Low viability: | | 8 | 0.82% | |
| | unknown: | | 3 | 0.31% | |
| Total pigs out: | | | 9.64 | | |
| Laid on | | 4.39% | These are the results without the | | |
| Pigs born | | 10.20 | Nooyen Farrowing Station unit. | | |
| Low viability | | 0.82% | | | |
| pigs out | | 9.84% | | | |
| unknown death | | 0.31% | | | |

TABLE II

NOOYEN FARROWING STATION-RESULTS    FLOOR #1
MORTALITY:

| DATE | # SOWS | PIGS BORN | LITTER I.D. | Laid on | Low Viab. | unknown | Pigs out |
|---|---|---|---|---|---|---|---|
| August 01 | 1 | 10 | | | | 1 | 9 |
| August 09 | 1 | 9 | | | | | 9 |
| August 14 | 1 | 11 | | | | | 11 |
| August 21 | 1 | 11 | | | | | 11 |
| August 29 | 1 | 10 | | | | | 10 |
| September 01 | 1 | 10 | | | | | 10 |
| September 03 | 1 | 11 | | | | | 11 |
| September 06 | 1 | 12 | | | | | 12 |
| September 09 | 1 | 11 | | | 1 | | 10 |
| September 13 | 1 | 10 | 572F | | | | 10 |
| September 17 | 1 | 11 | 577F | | | | 11 |
| September 21 | 1 | 9 | 585F | | | | 9 |
| September 24 | 1 | 12 | 593F | | 1 | 0 | 11 |
| September 26 | 1 | 13 | 597F | | | | 13 |
| October 02 | 1 | 9 | 610F | | | | 9 |
| October 03 | 1 | 9 | | | | | 9 |
| October 07 | 1 | 7 | | | | | 7 |
| October 10 | 1 | 11 | 616F | | | | 11 |
| October 22 | 1 | 12 | 633F | | | | 12 |
| October 26 | 1 | 11 | | | | | 11 |
| October 26 | 1 | 12 | 636F | | | | 12 |
| October 31 | 1 | 11 | 640F | | | | 11 |
| October 31 | 1 | 11 | | | 1 | | 10 |
| November 02 | 1 | 11 | 643F | | | | 11 |
| November 04 | 1 | 11 | 646F | | | | 11 |
| November 05 | 1 | 10 | 650F | | | | 10 |
| November 07 | 1 | 10 | 651F | | | | 10 |
| November 09 | 1 | 10 | 656F | | | | 10 |
| November 09 | 1 | 12 | 654F | | | | 12 |
| November 13 | 1 | 9 | 658F | | | | 9 |
| November 14 | 1 | 11 | 661F | | 1 | | 10 |
| November 14 | 1 | 12 | 659F | 1 | | | 11 |
| November 19 | 1 | 11 | 665F | | | | 11 |
| November 19 | 1 | 10 | 664F | | | | 10 |
| November 23 | 1 | 11 | | | | | 11 |
| November 26 | 1 | 10 | 674F | | | | 10 |
| November 26 | 1 | 11 | 676F | | | | 11 |
| November 30 | 1 | 13 | 681F | | 1 | | 12 |
| December 01 | 1 | 10 | 683F | | | | 10 |
| December 05 | 1 | 7 | 692F | | | | 7 |
| December 05 | 1 | 11 | 693F | | | | 11 |
| December 07 | 1 | 12 | 694F | | | | 12 |
| December 08 | 1 | 11 | 695F | | | | 11 |
| December 12 | 1 | 10 | 704F | | | | 10 |
| December 16 | 1 | 10 | | | | | 10 |
| December 21 | 1 | 11 | 720F | | | | 11 |
| December 28 | 1 | 11 | 723F | 1 | | | 10 |

TABLE II-continued

| | | | | | | | | |
|---|---|---|---|---|---|---|---|---|
| January 03 | 1 | 7 | 731F | | | | | 7 |
| January 08 | 1 | 11 | | | | | | 11 |
| | 49 | 516 | | 3 | 4 | 1 | | 508 |

| | | | | | | |
|---|---|---|---|---|---|---|
| | | | | total: | | 8 |
| Pigs Born/litter | | | 10.53 | | | |
| Mortality: | Laid on: | | 3 | 0.58% | Total Mortality: | 1.55% |
| | Low viability: | | 4 | 0.78% | | |
| | unknown: | | 1 | 0.19% | | |
| Total pigs out: | | | 10.37 | | | |
| Laid on | | 0.58% | *These are the results from the | | | |
| Pigs born | | 10.71 | Nooyen Farrowing Station unit. | | | |
| Low viability | | 0.97% | | | | |
| pigs out | | 10.52 | | | | |
| unknown death | | 0.19% | | | | |

We claim:

1. A farrowing station for constraining the movement of a sow so she is at liberty to stand therein and to lie down within, thereupon to nurse her litter of piglets, the station comprising:
   (a) a surrounding floor slab, carrying a farrowing crate for constraining the sow therein, the floor slab defining within the farrowing crate a perimeter across which independent pressure sensitive floor transport members travel to arrestingly stop when a predetermined pressure upon a member is exceeded.

2. A farrowing station for constraining the movement of a sow so she is at liberty to stand therein and to lay down whereupon to nurse her litter of piglets, the station comprising:
   (a) a surrounding floor slab, carrying a farrowing crate for constraining the sow, the floor slab defining within the farrowing crate a floor transport region;
   (b) the floor transport region carrying a plurality of relatively parallel movable endless belts;
   (c) means for transporting the belts across the floor transport region; and,
   (d) pressure responsive means for stopping travel of a belt crossing over the floor transport region when a predetermined pressure is applied to that belt, as by the hoof of the sow, but not that of a piglet.

3. The farrowing station as claimed in claim 2, wherein the transporting means includes a prime mover driving a drive cylinder over which one end of the belt travels, the opposite end of the belt travelling over an idler pulley, the belt having an upper and lower portion the upper portion travelling over a sub-floor against which the underside of the upper belt comes into contact with when said predetermined pressure is applied thereto so that the endless belt frictionally slides over the driving cylinder and belt travel for that belt is stopped.

4. The farrowing station as claimed in claim 3, wherein the sub-floor defines a plurality of races through which each belt travels.

5. The farrowing station as claimed in claim 4, wherein the sub-floor is plastic.

6. The farrowing station as claimed in claim 5, wherein the driven cylinder is stainless steel.

* * * * *